United States Patent

Simon

[15] 3,657,806

[45] Apr. 25, 1972

[54] METHOD FOR MANUFACTURING A THIN-FILM MAGNETIC HEAD ASSEMBLY

[72] Inventor: Paul Simon, Palo Alto, Calif.

[73] Assignee: International Business Machines Corporation, Armonk, N.Y.

[22] Filed: Dec. 28, 1970

[21] Appl. No.: 101,561

[52] U.S. Cl. ................................29/603, 29/626, 29/630 B, 29/630 D, 179/100.2 C

[51] Int. Cl. ........................................G11b 5/42, H01f 7/06

[58] Field of Search ....................179/100.2 C; 340/174.1 F; 346/74 MC; 29/603, 626, 630 B, 630 D

[56] References Cited

UNITED STATES PATENTS

| | | | |
|---|---|---|---|
| 3,429,040 | 2/1969 | Miller | 29/626 |
| 3,602,912 | 8/1971 | Bowers et al. | 29/603 X |
| 3,344,237 | 9/1967 | Gregg | 179/100.2 C |
| 3,116,540 | 1/1964 | Rutter | 29/603 |
| 3,202,879 | 8/1965 | Sterling | 174/68.5 X |

*Primary Examiner*—John F. Campbell
*Assistant Examiner*—Carl E. Hall
*Attorney*—Hanifin & Jancin and Robert W. Keller

[57] ABSTRACT

This application discloses a method of manufacturing a thin-film magnetic head assembly. The steps comprise preparing a ceramic substrate to have internal electrical conductors between the top surface and one of the side faces of the substrate, lapping the side face to expose the electrical conductors, first bonding a thin-film head to the side face, connecting conducting portions of the thin-film head to the exposed conductors, second bonding a circuit chip to the top surface of the ceramic substrate, and connecting the electrical conductors on the top surface of the ceramic substrate to the integrated circuit chip for providing electrical continuity from the integrated circuit chip to the thin-film head.

6 Claims, 2 Drawing Figures

INVENTOR.
PAUL SIMON

BY Robert W. Keller
ATTORNEY

METHOD FOR MANUFACTURING A THIN-FILM MAGNETIC HEAD ASSEMBLY

BACKGROUND OF THE INVENTION

1. Field of the Invention

This invention relates to manufacturing a thin-film magnetic head assembly and, more particularly, to a method for simply connecting thin-film heads and integrated circuit chips to a ceramic substrate.

2. Description of the Prior Art

In the quest for increasing the bit density recorded on a magnetic medium, a thin-film technology has been developed. Examples of this technology are exemplified in U.S. Pat. No. 3,271,751 issued to Walter E. Proebster and U.S. Pat. No. 3,344,237, issued to D. P. Gregg. These patents illustrate thin-film magnetic transducers which may be used in providing the desired high-density recording. However, problems have arisen in packaging and assembling the thin-film or batch-fabricated heads into a microminiature structure. This invention teaches a method of manufacturing a magnetic head assembly which provides a high-density array of magnetic heads incorporated into a compact, microminiature structure which particularly includes the electronic integrated circuit chips within a unitary structure.

SUMMARY OF THE INVENTION

An object of this invention is to provide a high-density array of thin-film heads and integrated circuit chips on a multi-layer ceramic substrate for use in high-density magnetic recording.

Another object is to provide a method of manufacturing a thin-film magnetic head assembly comprising the steps of preparing a ceramic substrate to have internal electrical conductors between the top surface and one of the side faces of the substrate, lapping the side face to expose the electrical conductors, first bonding a thin-film head to the side face so as to facilitate connecting the electrical conducting portions of the thin-film head to the exposed conductors, connecting the conducting portions of the thin-film head to the exposed conductors, second bonding an integrated circuit chip to the top surface of the ceramic substrate, and connecting the electrical conductors on the top surface of the ceramic substrate to the integrated circuit chip for providing electrical continuity from the integrated circuit chip to the thin-film head.

In accordance with the preceding object, it is still another object to bond the thin-film head to the face so that its transducing gap is no higher than the bottom surface of the ceramic substrate.

Still another object is to prepare the ceramic substrate so that its bottom surface is an air-bearing surface.

Still a further object is to connect the thin-film head to the exposed conductors by depositing a first conducting globule on the electrical conducting portions of the thin-film heads, depositing a second conducting globule on the exposed conductors, placing the first and second conducting globules in a physically contacting relationship and heating the contacting globules so as to form a conductive bond therebetween.

Still another object is to provide a miniature package with electrical components positioned on adjacent surfaces of a block with the components internally connected, such that no conductors are disposed externally along the block surfaces.

Further objects of the invention pertain to the particular steps of the method and several features thereof whereby the above outlined and additional operating methods thereof are attained.

The invention both as to its organization and method of operation, together with further objects and advantages thereof, will best be understood with reference to the following specification taken in connection with the accompanying drawing.

SUMMARY OF THE INVENTION

Figure 1:
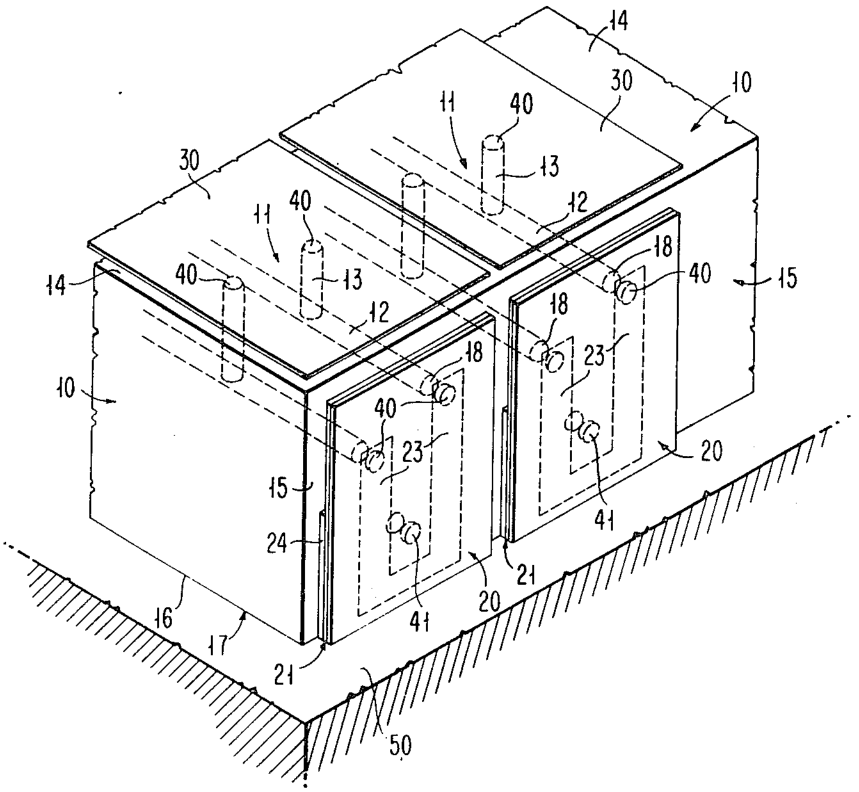
FIG. 1 is an isometric view of the invention illustrating the thin-film heads and integrated circuit chips connected to the multilayer ceramic.

Referring now to the drawings and, more particularly, to FIG. 1, there is shown an isometric view of the magnetic head assembly. A ceramic substrate 10 has a plurality of thin-film magnetic transducers 20 bonded to a side face 15 and a plurality of integrated circuit chips 30 bonded to the top surface 14.

The ceramic substrate 10 may preferably be a multi-layer ceramic having a plurality of internal electrical conductors 11 including both horizontal portions 12 and vertical portions 13 or via holes. The electrical conductors 11 are entirely enclosed within the body of the substrate 10. The substrate 10 is substantially a parallelapiped block having the top surface 14, a bottom surface 16, and side faces 15 substantially perpendicular to the top and bottom surfaces. The side face 15 of the substrate is lapped or polished to expose the terminations 18 of the electrical conductors 11. The bottom surface 16 is preferably lapped to such a profile so as to be an air-bearing surface 17. The conductors 11 are shown to have exposed terminations 18. Although preferably a unitary block, the substrate 10 may be comprised of a plurality of parallel horizontal blocks bonded together, with the bottom block being a high-grade ceramic having its bottom surface lapped to particularly form the air-bearing surface.

The block is prepared according to accepted multilayer ceramic (MLC) technology. Examples of this technology which teach the inclusion of the internal conductors within a ceramic substrate is found in the Roche et al. U.S. Pat. No. 3,319,317, issued May 16, 1967, and assigned in common with this application and the Schick U.S. Pat. No. 3,346, 950, issued Oct. 17, 1967, and assigned in common with this application. Examples of forming the conductors and via holes are found in IBM Technical Disclosure Bulletins by Ahn et al. Vol. 8, Mar. 1966, and by Reinhart, Vol. 10, May 1968. Ordinarily the multi-layer ceramic is porous, thus picking up grit and other contaminants during the lapping operation from the lapping compound that is used. By particularly using a high grade ceramic, the residue of the lapping compound collected in the voids is minimized.

The thin-film magnetic head 20 includes a first magnetic film layer deposited on a non-magnetic substrate and successive conducting and magnetic film layers thereon, each successive conducting and magnetic film layer forming a read/write element of the head. A thin-film head that may be utilized in this manufacturing method may be the single-turn head taught in the Proebster U.S. Pat., cited above, or the multi-turn head taught by the Gregg patent, also cited above.

The head 20 is first mechanically bonded to the side face 15 of the substrate 10 with its outer magnetic layer 24 proximate to or in contact with the face and with its transducing gap 21 contiguous with or co-planar with the bottom surface 16. Alternatively, the transducing gap 21 may be positioned below the surface 16 so that when in operation, the transducing gap is closest to the associated magnetic medium 50, thereby to minimize the possibility of the ceramic substrate crashing into the medium. In addition, the exposed terminations 18 of the conductors 11 should be adjacent the conducting portion of the head. Generally, the conducting portion of the head is the U-shaped conducting layer 23 although the invention is operable when the magnetic outer layer is adjacent the termination 18, since the magnetic layer is also electrically conductive.

Figure 2:
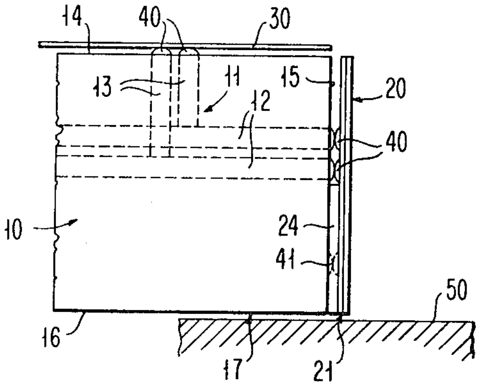
FIG. 2 is a side elevation view of FIG. 1.

As illustrated in FIG. 2, electrically conductive globules 40 which are preferably solder balls are selectively disposed on the exposed conductor terminations 18 and the conducting portion of the thin film head so as to physically contact one another. Upon heating the globules, they begin to flow and when subsequently cooled form an electrically conductive bond therebetween. The melting temperature of the globule is below the temperature that would cause thermal damage to the head, ceramic substrate or the integrated circuit chip. The heating is preferably accomplished by microminiature soldering techniques although temperature controlled ovens may be utilized. Alternatively, the globules may be joined by ultrasonic bonding. The globule may be held in its desired position by depositing a thin layer of glass therearound, thus preventing movement of the enclosed globule. A more detailed explanation of the method of joining a component to a substrate is found in the Miller U.S. Pat. No. 3,429,040, issued Feb. 25, 1969, and assigned in common with that of this application.

Similarly, an integrated circuit chip 30 is bonded to the flat top surface of the ceramic substrate. It is noted that prior to the development of microminiature solid state technology, circuits were comprised of discrete electrical components. Accordingly, individual electrical components may be mounted and bonded to the top surface of the ceramic substrate and these components are meant to be included within the meaning of the phrase integrated circuit chip. Globules 40 are also used to connect the exposed terminations of the vertical portion 13 of the electrical conductors 11 on the top surface of the ceramic substrate to the integrated circuit chip for providing electrical continuity from the integrated circuit chip to the thin-film head.

To increase the mechanical stability of the bond between the thin-film head 20 and the ceramic 10, additional solder globules 41 may be disposed between the head and the ceramic but not in contact with one of the terminations 18. Accordingly, this globule creates a physical non-conducting standoff between the head and the side of the ceramic substrate.

Thus, a high-density array of thin-film heads and electrical circuits in a unitary package has been described. In general, this invention teaches the interconnecting of electrical components on adjacent perpendicular surfaces without requiring any external connections or etched conductors thereon. Thus, this assembly is less susceptible to spurious electric and magnetic fields. Furthermore, the multiplicity of heads may be selectively connected to the multiplicity of integrated circuit chips to provide the desired electrical continuity therebetween. In particular, the single ceramic slider substrate may comprise 64 heads spaced over 6.25 mils center-to-center track spacing with 14 leads terminating in the top surface and connecting to the respective integrated circuit chips. The multilayer ceramic technology advantageously allows flexibility of the inner-connection layout since each conductor is insulated from one another and does not require that the substrate have grooves, slots or recesses for holding the electrical components.

From the above, it will be seen that there has been described a method for manufacturing a thin-film magnetic head assembly in a microminiature package which fulfills all the objects and advantages set forth above. While there has been described what is at present considered to be preferred embodiment of the invention, it will be understood that various modifications may be made therein and it is intended to cover in the appended claims all such modifications as fall within the true spirit and scope of the invention.

What is claimed is:

1. A method for manufacturing a thin-film magnetic head assembly comprising the steps of:
   preparing a ceramic substrate to have internal electrical conductors extending, between the top surface and one of the side faces of said substrate;
   lapping said side face to expose the ends of said electrical conductors;
   first bonding a thin-film head to said side face so as to facilitate connecting the electrical conducting portions of said thin-film head to said exposed ends;
   connecting said conducting portions of said thin-film head to said exposed ends;
   second bonding an integrated circuit chip to said top surface of said ceramic substrate; and
   connecting the ends of said electrical conductors on said top surface of said ceramic substrate to said integrated circuit chip for providing electrical continuity from said integrated circuit chip to said thin-film head.

2. The method set forth in claim 1, wherein said thin-film head is bonded to said face so that its transducing gap is no higher than the bottom surface of said ceramic substrate.

3. The method set forth in claim 1, wherein the step of preparing a ceramic substrate includes forming its bottom surface into an air-bearing surface.

4. The method set forth in claim 1, wherein said step of connecting said thin-film head to said exposed ends includes:
   depositing a first conducting globule on said electrical conducting portions of said thin-film heads,
   depositing a second conducting globule on said exposed ends;
   placing said first and said second conducting globules in a physically contacting relationship; and
   heating said contacting globules thus forming a conductive bond therebetween.

5. The method set forth in claim 4, wherein said first bond creates a physical standoff between said thin-film head and said side of said ceramic substrate for facilitating placing said first and second globules in said physically contacting relationship.

6. The method set forth in claim 1, wherein a plurality of thin-film heads is bonded to said side face and wherein a plurality of integrated circuit chips is bonded to said top surface, and including the step of selectively connecting the ends of said electrical conductors on said top surface to said integrated circuit chips for providing the desired electrical continuity to said thin-film heads.

* * * * *